United States Patent Office 3,779,979
Patented Dec. 18, 1973

3,779,979
PROCESS FOR THE PREPARATION OF NOVEL HIGH CHLORINATED BUTYL RUBBER AND VULCANIZABLE COMPOSITIONS CONTAINING THE SAME
Shozo Tsuchiya, Kawasaki, Japan, assignor to Nippon Oil Company, Ltd., Tokyo, Japan
Filed Dec. 21, 1971, Ser. No. 210,335
Int. Cl. C08c 11/22, 11/24; C08d 5/04
U.S. Cl. 260—33.6 A                 7 Claims

ABSTRACT OF THE DISCLOSURE

A process for the preparation of chlorinated isobutylene-multiolefin copolymer in which more than one but not exceeding 2 chlorine atoms per one double bond in the copolymer are introduced by chlorinating the copolymer in the presence of a diarylamine derivative of the formula

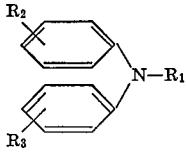

wherein $R_1$ represents a hydrocarbon residue of 1–20 carbon atoms and $R_2$ and $R_3$ each represent hydrogen or a hydrocarbon residue of 1–20 carbon atoms.

The chlorinated copolymer exhibits particularly improved co-vulcanizability, heat stability and adherability.

---

This invention relates to a process for making novel high chlorinated butyl rubbers which comprises chlorination of isobutylene-multiolefin copolymers, particularly isobutylene-isoprene copolymers (which are normally collectively referred to as butyl rubber) in the presence of diarylamine derivatives, and also to the novel vulcanizable compositions containing such high chlorinated butyl rubbers.

More particularly, the invention relates to a process for the preparation of novel chlorinated butyl rubber of high chlorine content (high chlorinated butyl rubber) which comprises chlorination of a copolymer of isobutylene and minor amount of multiolefin (butyl rubber) in the presence of at least one diarylamine derivative, thereby introducing into the rubber more than one but not exceeding two chlorine atoms per one double bond in the copolymer. The invention also relates to high chlorinated butyl rubber-containing vulcanizable composition having improved adhering property and co-vulcanization property, which is composed of 100 parts of above novel high chlorinated butyl rubber, 1–100 parts of divalent metal oxide, 0–150 parts of carbon black, 0–5 parts of stearic acid, 0–10 parts of sulfur, and 0–5 parts of vulcanization accelerator, the parts being by weight.

This invention thus relates to a process for making highly chlorinated butyl rubber of improved adherability as well as co-vulcanization property compared with known low chlorinated butyl rubbers containing at most one chlorine atom per one double bond, such as that described in Japanese Official Patent Gazette, Publication No. 13,233/60, as well as to vulcanizable compositions containing such novel high chlorinated butyl rubber. According to the subject process, the chlorination of hydrocarbon type rubbers composed chiefly of isobutylene is performed in the presence of a minor amount of at least one diarylamine derivative, whereby more than one but not exceeding two atoms of chlorine per one double bond in the starting polymer are introduced into the rubber.

As hydrocarbon type rubbers composed chiefly of isobutylene, butyl rubber is well known. Butyl rubber is one of the copolymers obtained by copolymerizing, as the monomers, approximately 70–99.5 mol percent of isobutylene with approximately 30–0.5 mol percent of multiolefin, and is normally composed of approximately 80–99.5 mol percent of isobutylene units and approximately 20–0.5 mol percent of isoprene units, more typically of approximately 90–99.5 mol percent of isobutylene units and approximately 10–0.5 mol percent of isoprene units. The copolymerization is normally performed at low temperatures, in the presence of cationic catalyst. Such butyl rubber is vulcanizable, and the vulcanization product has high tensile strength, excellent resistance properties against thermal aging, ozone, and chemicals, high electrical insulation property, and extremely low gas permeability. Because of those favorable properties, the vulcanization product has wide utilities as inner tubes of automobile tires, tire curing bags, insulative materials for electrical wire cables, heat-resistant conveyer belts, etc.

On the other hand, the butyl rubber is subject to such deficiencies as inferior co-vulcanizability with highly unsaturated rubbers such as natural rubber, due to its low degree of an unsaturation, and low adherability of minor amount of chlorine into the butyl rubber has been proposed. This is, chlorinated butyl rubber is in practice prepared by chlorination of ordinary butyl rubber obtained from isobutylene and a minor amount of isoprene. The product exhibits improved vulcanizability, co-vulcanizability, heat stability and adherability, compared with those of butyl rubber, and is used as tubeless tires for automobiles, etc., when blended with natural rubber and the like.

However, during the chlorination of butyl rubber, molecular weight reduction takes place concurrently with the improvement of the above properties, accompanying the increase in the amount of introduced chlorine. Particularly when the chlorine content exceeds one atom per one double bond in the starting butyl rubber, the molecular weight reduction becomes great, and side-reactions such as gelation also takes place. Furthermore the product is heavily colored. Thus the amount of chlorine introduced is subject to practical limits, and in spite of the possibility of further improvements in the above properties, introduction of more than one chlorine atom per one double bond in the starting butyl rubber has been considered impractical.

The object of the present invention is to provide a process for the preparation of high chlorinated butyl rubber which exhibits still improved vulcanization speed, co-vulcanizability with high unsaturated rubbers, and adherability, imparted by the introduction of chlorine, and also to provide vulcanizable compositions of such high chlorinated butyl rubber. The objects of the invention are achieved by the use of novel, high chlorinated butyl rubber of a previously considered impracticably high chlorine content, i.e., more than one chlorine atom per one double bond in the starting butyl rubber, and with a satisfactory high molecular weight, showing little molecular weight reduction during the chlorination.

A great deal of study has been made on such technical problems as the molecular weight reduction occurring with chlorination of butyl rubber, side-reactions such as gelation, increased ratio of chlorine introduction within the practically allowable molecular weight range, and improvement in adherability accompanying the increase in the introduced chlorine content. Prior to the present invention, no successful attempt to introduce more than one chlorine atom per one double bond while avoiding the objectionable molecular weight reduction during the chlorination of butyl rubber has been reported, except where the butyl rubber is reacted with maleic anhydride, concurrently with the chlorination. However, this is far from a perfect solution of the above technical problems, because it is industrially disadvantageous due to the complex post procedures such as removal of unreacted maleic anhydride.

It has now been discovered that, by performing the chlorination of butyl rubber in the concurrent presence of a minor amount of at least one diarylamine derivative, more than one but not exceeding two atoms per one double bond in the starting butyl rubber of chlorine can be introduced without reducing the molecular weigh of the rubber, and within such chlorine content range, high chlorinated butyl rubber of practically satisfactory molecular weight can be obtained. It has been further discovered that such high chlorinated butyl rubber exhibits still improved vulcanization speed, co-vulcanizability with high unsaturated rubber and adherability, compared with those of conventional low chlorinated butyl rubber into which at most one chlorine atom per one double bond in the starting butyl rubber is introduced.

Accordingly, the invention provides a process for the preparation of novel, high chlorinated butyl rubber containing more than one but not exceeding two chlorine atoms per one double bond in the starting butyl rubber, which comprises chlorination of butyl rubber in the presence of a minor amount of at least one diarylamine derivative. The invention also provides a novel, vulcanizable composition containing such high chlorinated butyl rubber, which is composed of 100 parts of the high chlorinated butyl rubber, 1–100 parts of divalent metal oxide, 0–150 parts of carbon black, 0–5 parts of stearic acid, 0–10 parts of sulfur, and 0.5 parts of vulcanization accelerator, the parts being by weight.

It is essential for the high chlorinated butyl rubber of this invention to contain more than one but not exceeding two chlorine atoms per one double bond in the starting butyl rubber. Particularly favorable vulcanization speed, co-vulcanizability with high unsaturated rubbers such as SBR and natural rubber, and adherability, are obtained when 1.5–1.9 chlorine atoms per double bond in the starting butyl rubber are introduced.

The sarting butyl rubbers employed in the invention are the copolymers composed of approximately 80–99.5 mol percent of isobutylene units and approximately 20–0.5 mol percent of multiolefin units, preferably those composed of approximately 90–99.5 mol percent of isobutylene units and 10–0.5 mol percent of multiolefin units. The "multiolefin" normally includes olefins of 4–16 carbons, such as butadiene, cyclopentadiene, piperylene, isoprene, and 1,3-dimethylbutadiene, isoprene being the most preferred.

The viscosity average molecular weight of the butyl rubber used in the invention is 200,000 to 2,000,000, preferably 30,000 to 1,000,000.

The diarylamine derivatives effective for the preparation of high chlorinated butyl rubber of this invention are those expressed by the general formula below:

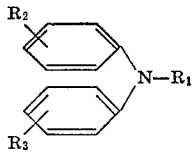

in which $R_1$ is a member of the group consisting of aliphatic, alicylic, and aromatic hydrocarbon radicals of 1–20 carbon atom, and $R_2$ and $R_3$ are each members of the group consisting of a hydrogen atom and aliphatic and alicylic hydrocarbon radicals of 1–20 carbon atoms, and $R_2$ and $R_3$ may be the same or different.

Referring to the above formula, when $R_1$ is hydrogen, the compounds are inffective as shown in the later given Controls. Also the compounds with $R_1$ containing more than 20 carbons are not easily available on industrial scale, and are therefore less practical. Industrially preferred $R_1$ groups include saturated or unsaturated aliphatic hydrocarbon radicals of 1–16 carbon atoms, such as methyl, ethyl, butyl, butenyl, octyl, octenyl, lauryl and cetyl radicals, or aromatic hydrocarbon residues of 6 to 20 carbon atoms such as phenyl and phenyls substituted with aliphatic or aromatic hydrocarbon residues. Also the preferred $R_2$ and $R_3$ groups are selected from the group consisting of a hydrogen atom and aliphatic hydrocarbon radicals of 1–16 carbon atoms. More specifically, preferred $R_2$ and $R_3$ groups are a hydrogen atom, methyl, ethyl, n-propyl, iso-propyl, n-butyl, iso-butyl, octyl, and cyclohexyl radicals, a hydrogen atom and lower alkyl groups such as methy and ethyl being particularly preferred. The $R_2$ and $R_3$ groups may be in the ortho-, meta-, or para-positions.

The amine derivatives can be used either singly or as mixtures of more than one derivative.

The suitable amount of the diarylamine derivative or derivatives employed for the preparation of the high chlorinated butyl rubber of this invention ranges from 0.01–10 parts, preferably 0.05–1 part, per 100 parts of starting butyl rubber, the parts being by weight.

The chlorinating agents useful for the preparation of the high chlorinated butyl rubber of this invention may be gaseous chlorine, alkali metal hypochlorites, particularly sodium hypochlorite and sulfur chlorides inter alia sulfur oxychlorides such as sulfuryl chloride; pyridinium chloride and perchloride. While any other conventional chlorinating agents can be used, gaseous chlorine and sulfuryl chloride are the most preferred.

The chlorination is effectively performed within a period of about one minute to several hours at 0 to 100° C., preferably 20 to 80° C. The temperature and time are controlled so that more than one but not exceeding two chlorine atoms, preferably 1.5 to 1.9 atoms, are introduced per double bond of the starting butyl rubber. The amount of chlorine to be introduced is controlled within this range so as to achieve the desired object of improving the properties of the rubber such as improved adherability. For example, the amount of chlorine can be controlled at a temperature of 20 to 80° C. with a time of 5 minutes to several hours. When low temperature chlorination for a prolonged period is adopted, the adjustment of temperature and time is more effective. If the chlorination temperature is below 0° C., the chlorination speed becomes objectionably low. On the other hand temperatures higher than 100° C. cause decomposition of the starting butyl rubber, and therefore should be avoided.

The improvement in such properties as adherability of butyl rubber brought about by the introduction of chlorine is still insufficient when the introduction ratio is one or less chlorine atom per double bond in the rubber. On the other hand, introduction of two or more chlorine atoms per double bond invites reduction in elasticity of the rubber product. Thus the adjustment of chlorine introduction within the already specified range is critical.

The chlorination in accordance with the invention can be practiced in various manners. One method is the addition of chlorine or other chlorination agent, preferably in the form of a solution in alkyl chloride, carbon tetrachloride, etc., to the solution of starting butyl rubber and a minor amount of diarylamine derivative in a suitable inert liquid organic solvent, for example, inert hydrocarbons, such as hexane, heptane, naphtha, mineral spirit, benzene, toluene, chlorobenzene, chloroform, trichloroethane, carbon tetrachloride, etc. Another method comprises contacting a gaseous chlorinating agent with a solution of starting butyl rubber and a minor amount of diarylamine derivative or derivatives.

Either of the above methods can be satisfactorily practiced at atmospheric pressure, but higher or lower pressures may also be employed. The pressure is suitably variable during the reaction in correlation with the aforesaid chlorination temperature and time, within the range of, for example, 1/10 to 30 atmospheres.

The chlorination with gaseous chlorine is normally performed at around 0–80° C., advantageously at approximately 0–65° C., preferably at 20–50° C., for approximately 1 minute to several hours. Advantageous pressure range is approximately from 1/20 to 20 atmospheres, atmospheric pressure being quite satisfactory. Specific chlorination conditions are selected to achieve the chlorination of the starting butyl rubber to the already specified degree.

The butyl rubber to be chlorinated is advantageously first dissolved in any of the aforesaid solutions, particularly in a saturated hydrocarbon or a completely chlorinated hydrocarbon.

Preferred solvents to be used for the chlorination together with gaseous chlorine are carbon tetrachloride, chloroform, cyclohexane, cyclopentane, toluene, particularly hexane, heptane, benzene, or their mixtures.

The butyl rubber concentration in the solvent is variable according to the model of reactor, preparation system, and molecular weight of the rubber, normally within the range of 1–30 wt. percent, preferably 5–20 wt. percent. The chlorination can be effected batchwise or continuously, under stirring. After termination of the chlorination the product can be recovered, refined and dried, by various means. Conventional operation means and conditions are well applicable to those procedures. The highly chlorinated butyl rubber normally has the viscosity average molecular weight within the range of 300,000–800,000, and the degree of unsaturation ranging approximately 0.5–10.0, preferably 1.0–5.0 mol percent. As already mentioned, such rubber invariably contains more than 1 but not exceeding 2 chlorine atoms per one double bond in the starting butyl rubber.

The high chlorinated butyl rubber can be blended with other known substances in a manner similar to conventional low chlorinated butyl rubber, to form vulcanizable compositions. That is, the rubber is crosslinkable by the action of such divalent metal oxide and/or sulfur as below, in the optional presence of a vulcanization accelerator such as thiuram polysulfides, or other derivatives of thiocarbamic acid. The vulcanization (crosslinking) can be performed, using such vulcanizing agent and/or vulcanization accelerator as, for example, (1) zinc oxide, (2) zinc oxide and sulfur, (3) zinc oxide and tetramethylthiuram disulfied, (4) sulfur and zinc dialkylpolythiocarbamate, (5) tetramethylthiuram disulfide, (6) tellurium diethyldithiocarbamate, (7) lead oxide and p-quinonedioxime and/or sulfur, (8) sulfur, benzothiazlydisulfide, and p-quinonedioxime, and (9) p-quinonedioxime benzoate, lead oxide and sulfur.

It is advantageous to form the vulcanizable compositions by blending the vulcanizing agent, accelerator, and filler, etc., at the following quantitative ratios, per 100 parts by weight of the high chlorinated butyl rubber of the present invention.

| Component | Parts by weight | |
|---|---|---|
| | Usable range | Preferred range |
| Carbon black | 0–150 | 27–75 |
| Zinc oxide | 1–100 | 2–30 |
| Parting agent (e.g. stearic acid) | 0–5 | 0–2 |
| Sulfur | 0–10 | 0–5 |
| Accelerator (e.g., tetramethylthiuram disulfide) | 0–5 | 0–2 |
| Antioxidant (e.g., N-lauryl p-aminophenol) | 0–5 | 0–2 |

The homo- or co-vulcanization of the high chlorinated butyl rubber of the invention or blend thereof with other rubber materials as vulcanizable compositions as above can be performed at approximately 95–230° C., preferably 120–180° C., consuming approximately several seconds to several tens of hours. Normally, the vulcanization or co-vulcanization is practiced, for example, at 95° C., for approximately 10 minutes to 20 hours, or at 200° C., for ½ to 20 minutes. Specific vulcanization conditions can be suitably selected according to the intended utility of the vulcanization product, and properties and quantities of the high chlorinated butyl rubber of this invention and of the rubber additives to be vulcanized therewith. Generally speaking, the optimum results are obtained by the vulcanization at approximately 120–200° C. for 30 minutes to 5 hours. It is also permissible to blend a conventionally employed process oil with the compositions of this invention.

The novel high chlorinated butyl rubber compositions of the invention as above-described are vulcanizable by still wide varieties of shaping processings and vulcanizing means, according to each specific object. The compositions allow the preparation of valuable rubber products of remarkable improved properties such as adherability, compared with similar compositions of conventional low chlorinated butyl rubber, with economical advantages and industrial ease.

Hereinafter the unique features of this invention will be further explained, with reference to the working examples and controls, in which the parts are by weight, unless otherwise specified. In the examples the statements are also made with reference to the accompanying drawings in which.

EXAMPLE 1

Figure 1:
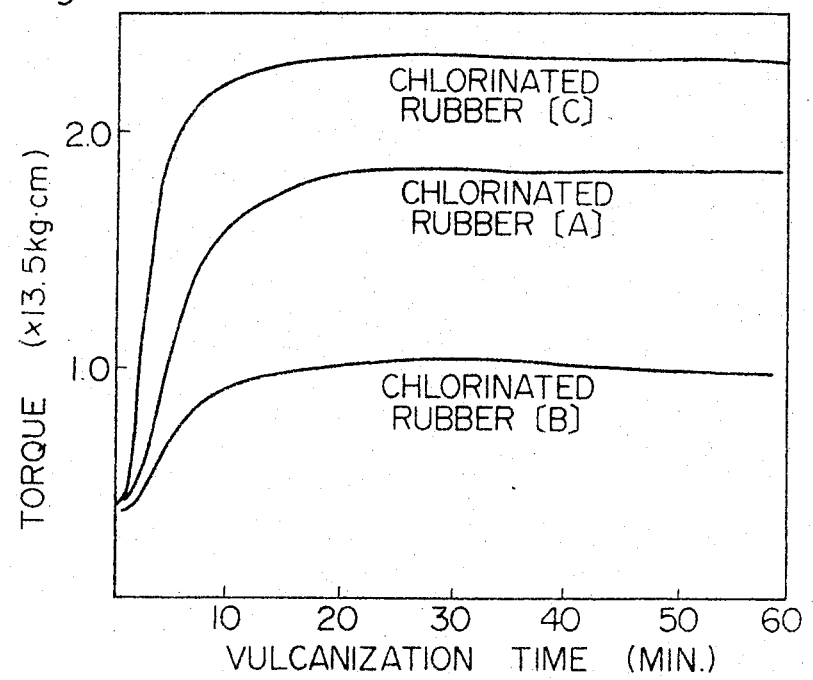
FIG. 1 is a graph showing vulcanizability of chlorinated butyl rubbers blended in a sulfur-vulcanization systems, measured with a curelastometer.

To a solution of 95 parts of isobutylene and 5 parts of isoprene in methyl chloride, 0.2 part of aluminum secondary butoxide and 0.5 part of boron trifluoride, per 100 parts of the monomer, were added, and the polymerization was effected at −100° C. Then the solvent was stripped, and the solid product was washed with water to remove the catalyst by decomposition. As a result a rubbery copolymer (butyl rubber [L]) having a degree of unsaturation of 1.47 mol percent, and a viscosity average molecular weight of 450,000 was obtained. The copolymer dissolved in dry n-hexane, to form three lots (No. 1, No. 2, and No. 3) of a 10% solution each containing 500 g. of the copolymer.

(Control 1)

Into lot No. 1 maintained at 50° C., 300 millimols of chlorine gas were blown, and the system was dropped into methanol, and the polymer was separated by filtration. The polymer was re-precipitated twice from a toluene-methanol system and dried under reduced pressure to provide a chlorinated rubber [A]. The product had a viscosity average molecular weight of 420,000, and contained 0.95 chlorine atom per one double bond in the starting butyl rubber [L]. The degree of chlorination is about the same with that of conventional, low chlorinated butyl rubber.

(Control 2)

Into the lot No. 2, 500 millimols of chlorine gas were blown, to synthesize chlorinated rubber [B]. This polymer was semi-solid, had a low molecular weight of 150,000, and contained 1.50 chlorine atoms per double bond. This corresponds to the known high chlorinated, low molecular weight butyl rubber. (Example of this invention.)

In accordance with this invention, 2.5 g. of diphenyloctylamine were added to the lot No. 3 solution, and into the system maintained at 50° C., 500 millimols of chlorine gas were blown, to synthesize the chlorinated rubber [C]. This rubber had a viscosity average molecular weight of 400,000 and contained 1.80 chlorine atoms per one double bond.

(Vulcanization test)

The synthesized chlorinated rubbers [A], [B] and [C] were formed into compositions according to the recipe as given in Table 1, and vulcanized. The results of tensile test of the vulcanization products were as shown in Table 2.

TABLE 1

|  | Parts |
|---|---|
| Rubber (vulcanization temp. 150° C.; vulcanization time 40 min.) | 100 |
| HAF black | 50 |
| Zinc flower | 5 |
| Sulfur | 2 |
| Mercaptobenzothiazole | 1.5 |
| Tetramethylthiuram disulfide | 0.5 |
| Stearic acid | 1 |
| N-phenyl-β-naphthylamine | 1 |

TABLE 2

|  |  | Tensile strength, kg./cm.² | 300% modulus, kg./cm.² | Elongation, percent |
|---|---|---|---|---|
| Control | Chlorinated rubber [A] | 190 | 115 | 500 |
| Do | Chlorinated rubber [B] | 110 | 90 | 350 |
| Example | Chlorinated rubber [C] | 220 | 170 | 400 |

The test results indicate that, when octyldiphenylamine is added to the chlorination reaction system of butyl rubber in accordance with the invention, even with the polymer's chlorine content exceeding one chlorine atom per one double bond in the starting rubber (1.8 in this example), very little molecular chain breakage takes place, as proven by the viscosity average molecular weight of 400,000 of the chlorinated rubber of this example.

Also the high chlorinated butyl rubber of this example (chlorinated rubber [C]) has very high tensile strength and modulus as shown in Table 2, and exhibits remarkably better properties than those of conventional chlorinated butyl rubber (chlorinated butyl rubber [A]). If the chlorination is performed to introduce more than one chlorine atom per one double bond simply by blowing chlorine gas into the butyl rubber solution, the resulting chlorinated butyl rubber (chlorinated rubber [B]) shows great molecular weight reduction, and the vulcanization product thereof has extremely poor physical properties, as indicated in Table 2.

Also the vulcanization speeds of those compositions respectively containing the chlorinated rubbers [A], [B], and [C]) were measured with a curelastometer with the results as illustrated in FIG. 1, from which it can be understood that the chlorinated rubber [C] of this invention has remarkably higher vulcanization speeds than that of conventional low chlorinated butyl rubber (chlorinated rubber [A]).

EXAMPLE 2

Figure 2:
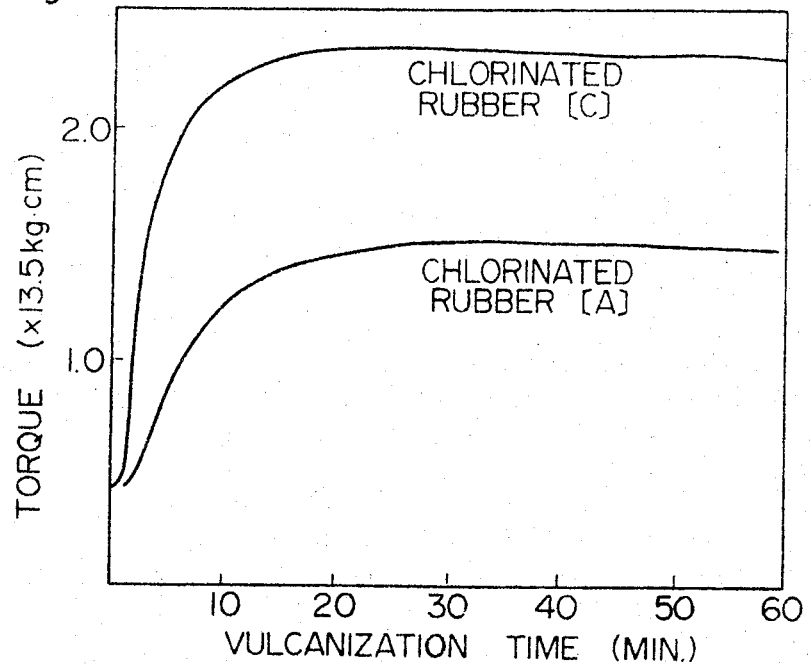
FIG. 2 is a graph showing vulcanizability of chlorinated butyl rubbers blended in a sulfur donor-vulcanization system, measured with a curelastometer.

The conventional low chlorinated butyl rubber (chlorinated rubber [A]) and the high chlorinated butyl rubber of this invention (chlorinated rubber [C]) as synthesized in Example 1 were formed into vulcanizable compositions according to the recipe below, and their vulcanization speeds were measured with a curelastometer. The results were as shown in FIG. 2.

TABLE 3

Recipe

|  | Parts |
|---|---|
| Rubber | 100 |
| HAF black | 50 |
| Zinc flower | 5 |
| Tetramethylthiuram sulfide | 1.5 |
| Stearic acid | 2 |
| N-phenyl-β-naphthylamine | 1 |

The results indicate that in the compositions containing no sulfur as above, the high chlorinated butyl rubber of this invention (chlorinated rubber [C]) shows particularly high vulcanization speed, much higher than that of conventional low chlorinated butyl rubber (chlorinated rubber [A]).

The same compositions were vulcanized at 150° C. for 30 minutes, and the vulcanization products were subjected to tensile test. The results were as shown in Table 4.

TABLE 4

|  |  | Tensile strength, kg./cm.² | 300% modulus, kg./cm.² | Elongation, percent |
|---|---|---|---|---|
| Control | Chlorinated rubber [A] | 180 | 110 | 500 |
| Example of this invention | Chlorinated rubber [C] | 215 | 190 | 350 |

The results shown in Table 4 above, indicate that even in the vulcanization system containing no sulfur, the high chlorinated butyl rubber of this invention (chlorinated rubber [C]) shows remarkably high modulus. Thus it can be understood that the low chlorinated butyl rubber of a chlorine content not exceeding one atom per one double bond in the starting rubber (chlorinated rubber [A]) and the high chlorinated butyl rubber containing more than one chlorine atom per one double bond obtained in accordance with this invention (chlorinated rubber [C]) have entirely different properties.

EXAMPLE 3

The high chlorinated butyl rubber synthesized in Example 1 (chlorinated rubber [C]) was used to form a vulcanizable composition as below, and co-vulcanized with SBR. The comparison, similar co-vulcanization was performed using conventional low chlorinated butyl rubber (chlorinated rubber [A]) and un-chlorinated butyl rubber (butyl rubber [L]).

TABLE 5

|  | Example | | Control | | Control | |
|---|---|---|---|---|---|---|
| Composition | I | II | III | IV | V | VI |
| Recipe: | | | | | | |
| Chlorinated rubber [C] | 100 | 75 | | | | |
| Chlorinated rubber [A] | | | 100 | 75 | | |
| Starting butyl rubber [L] | | | | | 100 | 75 |
| SBR-1500 | | 25 | | 25 | | 25 |
| Zinc flower | 5 | 5 | 5 | 5 | 5 | 5 |
| Sulfur | 2 | 2 | 2 | 2 | 2 | 2 |
| Mercaptobenzothiazole | 1.5 | 1.5 | 1.5 | 1.5 | 1.5 | 1.5 |
| Tetramethylthiuramdisulfide | 0.15 | 0.15 | 0.15 | 0.15 | 0.15 | 0.15 |
| Stearic acid | 1 | 1 | 1 | 1 | 1 | 1 |
| N-phenyl-β-naphthylamine | 1 | 1 | 1 | 1 | 1 | 1 |
| HAF black | 50 | 50 | 50 | 50 | 50 | 50 |

The results of co-vulcanization at 140° C. for 30 minutes were as in Table 6 below.

TABLE 6

|  | Composition | Tensile strength | Tensile¹ strength retention in co-vulcanization with SBR, percent | 200% modulus, kg./cm. |
|---|---|---|---|---|
| Example of this invention. | I | 175 | 88 | 50 |
|  | II | 155 | | 120 |
| Control | III | 165 | 67 | 40 |
|  | IV | 100 | | 90 |
| Do | V | 165 | 48 | 20 |
|  | VI | 80 | | 10 |

¹ The ratios of tensile strengths of the Compositions II, IV, and VI each containing 25 parts of SBR, to the tensile strength of, respectively, the Compositions I, III, and V.

The results shown in Table 6 above indicate that the high chlorinated rubber has excellent covulcanizability with SBR. That is, although Compositions II, IV, and VI containing SBR have reduced tensile strengths compared with, respectively, the Compositions I, III, and V, the reduction ratio in the property between Compositions I and II is notably less than those between the corresponding Control compositions. Also modulus of the Composition II is considerably higher than that of Composition IV. Those facts prove that the high chlorinated butyl rubber of this invention has excellent co-vulcanizability with SBR, showing markedly improved affinity with poly-unsaturated rubber such as SBR, compared with that of starting butyl rubber or of conventional low chlorinated butyl rubber.

EXAMPLE 4

Ninety-three (93) parts of isobutylene and 7 parts of isoprene were dissolved in methyl chloride, and to the solution 0.2 part of aluminum chloride per 100 parts of the monomer was added. The system was allowed to polymerize at $-100°$ C., and subsequently the solvent was stripped. The polymerization product was washed with water to remove the catalyst by decomposition. As a result a rubbery copolymer having a degree of unsaturation of 2.20 mol percent, and a viscosity average molecular weight of 410,000 (butyl rubber [M]) was obtained.

This copolymer was dissolved in chloroform to form a 15 wt. percent solution, and into the solution 0.5 wt. percent to the polymer of triphenylamine was added in accordance with this invention. While the system was maintained at 40° C., chlorine was blown thereinto to synthesize the following two types of chlorinated rubber. In Table 7 below, a chlorinated rubber [D] having low chlorine content, is shown for comparison purpose.

TABLE 7

| | | Number of chlorine atom per one double bond | Viscosity, average molecular weight |
|---|---|---|---|
| Control | Chlorinated rubber [D] | 0.92 | 390,000 |
| Example of this invention | Chlorinated rubber [E] | 1.59 | 390,000 |

Under the identical conditions, chlorine was blown into the foregoing 15 wt. percent chloroform solution of the copolymer containing no triphenylamine, to form the two types of chlorinated rubber as in Table 8 below.

TABLE 8

| | | Number of chlorine atoms per one double bond | Viscosity, average molecular weight |
|---|---|---|---|
| Control | Chlorinated rubber [F] | 0.93 | 390,000 |
| Control [G] | Chlorinated rubber [G] | 1.60 | 120,000 |

Thus synthesized rubbers were each blended with other components to form vulcanizable compositions, according to the recipe below.

TABLE 9

| Component: | Part |
|---|---|
| Rubber | 100 |
| HAF black | 50 |
| Zinc flower | 5 |
| Sulfur | 2 |
| Mercaptobenzothiazole | 1.5 |
| Tetramethylthiuram disulfide | 1 |
| N-phenyl-$\beta$-naphthylamine | 1 |

Each composition was vulcanized at 150° C. for 30 minutes, with the results as shown in Table 10 below.

TABLE 10

| | | Tensile strength, kg./cm.² | 300% modulus, dg./cm.² | Elongation, percent |
|---|---|---|---|---|
| Control | Chlorinated rubber [D] | 180 | 110 | 550 |
| Example of this invention | Chlorinated rubber [E] | 200 | 170 | 400 |
| Control | Chlorinated rubber [F] | 180 | 105 | 500 |
| Do | Chlorinated rubber [G] | 80 | | 200 |

The results in the above Tables 7 and 8 indicate that, when the chlorination reaction is performed with the addition of triphenylamine in accordance with this invention, approximately 1.6 chlorine atoms per one double bond in the starting butyl rubber can be introduced without substantial reduction in molecular weight. The chlorinated rubber [E] obtained gives the vulcanization product having characteristically high tensile strength and modulus, as shown in Table 10, compared with those of the vulcanization products of chlorinated rubber [D] containing not more than 1 chlorine atom per double bond, and of the chlorinated rubber [F]. The rubber chlorinated in the absence of triphenylamine to the extent that its chlorine content exceeds one atom per double bond, e.g. 1.60 chlorine atoms (chlorinated rubber [G]), shows appreciable molecular weight reduction (Table 8), and the vulcanization product thereof has markedly deteriorated properties of rubber, and is useless for any practical use (Table 10). Again, if no more than one chlorine atom per double bond is introduced, regardless of the addition of triphenylamine, the resulting chlorinated rubber has substantially the same molecular weight and gives the vulcanization product of equivalent physical properties, as illustrated by the cases of chlorinated rubbers [D] and [F]. The latters' physical properties are inferior to those of the high chlorinated butyl rubber of this invention (chlorinated rubber [E]).

EXAMPLE 5

The high chlorinated butyl rubber obtained in Example 4 (chlorinated rubber [E]) was used in the composition specified below, to be co-vulcanized with natural rubber. For comparison, identical co-vulcanization was performed, except that the synthetic rubber component was replaced by a conventional low chlorinated butyl rubber (chlorinated rubber [F]).

TABLE 11

| | Example of this invention | | Control | |
|---|---|---|---|---|
| Composition | VII | VIII | IX | X |
| Chlorinated rubber: | | | | |
| [E] | 100 | 75 | | |
| [F] | | | 100 | 75 |
| Natural rubber | | 25 | | 25 |
| Zinc flower | 5 | 5 | 5 | 5 |
| Sulfur | 2 | 2 | 2 | 2 |
| Tetramethylthiuram disulfide | 1 | 1 | 1 | 1 |
| Benzothiazyl disulfide | 0.5 | 0.5 | 0.5 | 0.5 |
| Stearic acid | 1 | 1 | 1 | 1 |
| N-phenyl-$\beta$-naphthylamine | 1 | 1 | 1 | 1 |
| EPC black | 50 | 50 | 50 | 50 |

The vulcanization results of those blends each at 140° C. for 30 minutes were as given in Table 12 below.

TABLE 12

| | Composition | Tensile strength, kg./cm.² | Tensile strength retention in co-vulcanization, percent | 300% modulus, kg./cm.² | Elongation, percent |
|---|---|---|---|---|---|
| Example of this invention | VII | 190 | 84 | 130 | 550 |
| | VIII | 160 | | 150 | 350 |
| Control | IX | 170 | 77 | 70 | 500 |
| | X | 180 | | 90 | 400 |

The foregoing results indicate that the high chlorinated butyl rubber of this invention (chlorinated rubber [E]) has improved co-vulcanizability with natural rubber, in comparison with conventional low chlorinated butyl rubber (chlorinated rubber [F]).

EXAMPLE 6

The butyl ruber [M] synthesized in Example 4 was dissolved in carbon tetrachloride to form a 10% solution thereof. To the solution, 0.5 wt. percent based on the weight of the polymer of N-methyldiphenylamine was added, and three types of chlorinated rubbers as identified in Table 13 below were prepared, using sulfuryl chloride as the chlorinating agent. The chlorination was performed at 50° C.

TABLE 13

| | | Number of chlorine atom(s) per double bond | Viscosity, average molecular weight |
|---|---|---|---|
| Control | Chlorinated rubber [H] | 0.71 | 410,000 |
| Example of this invention. | Chlorinated rubber [I] | 1.30 | 390,000 |
| | Chlorinated rubber [J] | 1.81 | 380,000 |

Each rubber was used in the composition as specified in Table 14 below:

TABLE 14

| Component: | Part |
|---|---|
| Rubber | 100 |
| Zinc flower | 5 |
| Sulfur | 2 |
| Tetramethylthiuram disulfide | 1 |
| Stearic acid | 1 |

Figure 3:
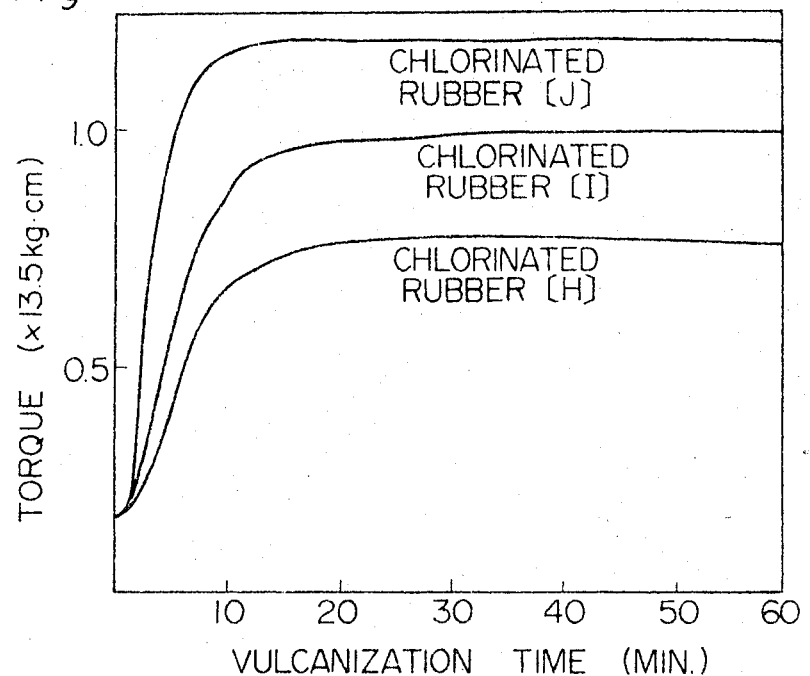
FIG. 3 is a graph showing the vulcanizability of pure rubber blends of chlorinated butyl rubbers, measured with a curelastometer.

The resulting compositions were vulcanized at 150° C., and their respective vulcanization speed was measured with a curelastometer, with the results as shown in FIG. 3. The chlorinated rubber [J] had remarkably high vulcanization speed, while the chlorinated rubber [H] had the least vulcanization speed among the three. That is, the chlorinated rubbers [I] and [J] containing more than 1 but not exceeding 2 chlorine atoms per one double bond of the starting butyl rubber, which, therefore, are high chlorinated butyl rubbers within the scope of this invention, have remarkably greater vulcanization speed compared with the low chlorinated butyl ruber (chlorinated rubber [H]). Among the former two, the chlorinated rubber [J] of greater chlorine content had a particularly high vulcanization speed. This indicates that the introduction of aproximately 1.5-1.9 chlorine atoms per one double bond in the starting butyl rubber achieves particularly favorable results.

EXAMPLE 7

The butyl rubber synthesized in Example 1 was dissolved in carbon tetrachloride to form a 10% solution thereof. Into the solution various diarylamine derivatives were added in accordance with the invention, and thereafter chlorine gas was blown into the solution to form chlorinated rubber of various chlorine contents. The correlation of their molecular weights versus chlorine contents are shown in Table 15 below. In the same table, the results of Control runs are given concurrently, in which no diarylamine derivative was added, or an amine other than those specified in this invention was added.

TABLE 15

| Additive | Amount, weight precent | Chlorine content, Cl/F [1] | Molecular weight, ten-thousands |
|---|---|---|---|
| Control | | 0.90 | 39 |
| | | 1.20 | 28 |
| | | 1.50 | 12 |
| Diphenylamine (control) | 0.5 | 0.89 | 41 |
| | | 1.21 | 22 |
| | | 1.54 | 13 |
| N-p-tolyldiphenylamine | 0.5 | 1.10 | 42 |
| | | 1.60 | 40 |
| | | 2.21 | 17 |
| N-cetyldiphenylamine | 0.5 | 1.50 | 38 |
| | | 2.37 | 10 |
| N-ethyl, N-p-tolylaniline | 0.7 | 0.91 | 41 |
| | | 1.70 | 38 |
| | | 2.50 | 10 |
| N-octyldiphenylamine | 0.5 | 0.81 | 41 |
| | | 1.51 | 40 |
| | | 1.81 | 39 |
| | | 2.31 | 17 |
| N,N-di-p-tolyaniline | 1.0 | 1.72 | 39 |
| | | 2.21 | 20 |
| N-iso-propyldiphenylamine | 0.7 | 0.91 | 41 |
| | | 1.61 | 40 |
| | | 2.50 | 12 |
| N-octyldiphenylamine and triphenylamine | 0.3 / 0.2 | 0.92 | 40 |
| | | 1.62 | 39 |
| | | 2.28 | 15 |
| Triphenylamine and N-methyl-diphenylamine | 0.3 / 0.3 | 1.52 | 39 |
| | | 2.50 | 10 |

[1] Cl/F is the number of chlorine atom(s) per one double bond in the starting butyl rubber.

The results in the above Table 15 indicate that, in the chlorination reaction of butyl rubber, introduction of more than one chlorine atom per one double bond in the starting butyl rubber without producing molecular weight reduction is possible only by the addition of a specified group of diarylamine derivatives, and also that in all cases introduction of more than two chlorine atoms per double bond is difficult.

Figure 4:
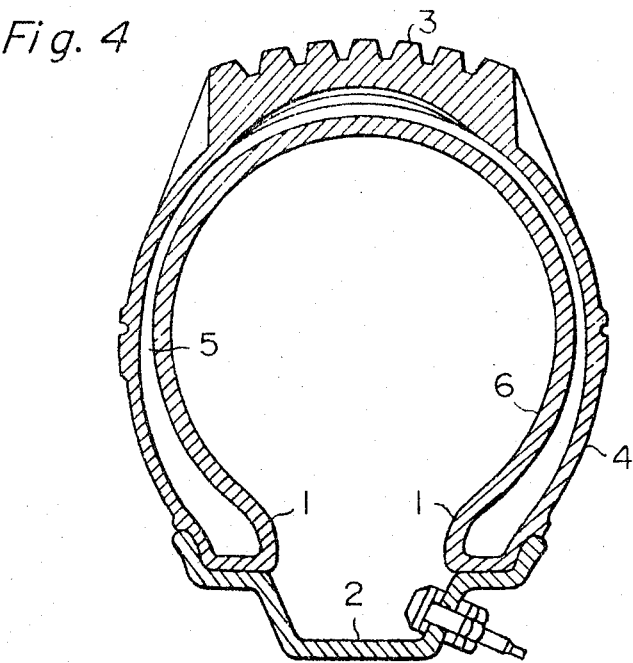
FIG. 4 shows one example of cross-section of a tubeless tire.

From the results of foregoing Examples 1 through 7 and various Controls, it became apparent that the high chlorinated butyl rubber of this invention shows fully satisfactory vulcanization properties also in the co-vulcanization with poly-unsaturated rubber such as SBR and natural rubber. An example of using the high cholrinated butyl rubber of this invention as a component of automobile tires will be further given hereinbelow. FIG. 4 shows the cross-section of an automobile's tubeless tire. Referring to such drawing, 1 is the bead portion formed of a great number of bead line metals embedded in rubber, and is adhered to rim 2. The outer surfaces of the tire are composed of the tread face 3 and side wall 4, and the adjacent layer to the outermost layer is normally composed of rubber carcass 5 incorporated with a combination of plural fabrics such as cotton, rayon, or nylon, or polyester cord, etc. The tire lining 6 is preferably composed of air-impermeable rubber. Thus the tire is formed of multiple, at least three, layers, and the face of each adjacent layer is adhered by ordinary adhesion means or by vulcanization, to form an integral body of the tire. Air-impermeable butyl rubber is a suitable material for the lining 6, but because poly-unsaturated rubber is normally used for the carcass portion, butyl rubber which is not appreciably adhesion co-vulcanizable with such rubber is inappropriate. For this reason, rubber compositions having low air-permeability and which are adhesion co-vulcanizable with poly-unsaturated rubber, e.g., mixtures of poly-unsaturated rubber such as natural rubber, with butyl rubber or chlorinated butyl rubber, are employed for tire lining. However, such mixtures also have the deficiency of weak adherability of the adhesion co-vulcanized surface. It is also known that, by increasing the butyl rubber or chlorinated butyl rubber content of such mixtures, a high quality lining of lower air-permeability can be formed. It was discovered that the use of high chlorinated butyl rubber such as those shown in Examples 1-7 in the compositions for tubeless tire lining can effectively solve the foregoing problems. That the replacement of conventional low chlorinated butyl rubber with the chlorinated butyl rubber of high chlorine content disclosed in this invention conspicuously improves the adherability of the lining surfaces is clearly demonstrated by Example 8 given below.

EXAMPLE 8

The high chlorinated butyl rubber synthesized in Example 1 (chlorinated rubber [C]), ordinary butyl rubber [L], and conventional low chlorinated butyl rubber (chlorinated rubber [A]) were used to form the following six types of compositions (i) through (vi), according to the recipe below which is conventional for an inner liner for tubeless tire.

TABLE 16

| | Composition (I) | | | Composition (II) | | |
|---|---|---|---|---|---|---|
| Component | (i), part | (ii), part | (iii), part | (iv), part | (v), part | (vi), part |
| Chlorinated rubber [C] | 50 | | | 50 | | |
| Natural rubber | 50 | 50 | 50 | 50 | 50 | 50 |
| Ordinary butyl rubber [L] | | | 50 | | | 50 |
| Chlorinated rubber [A] | | 50 | | | 50 | |
| HAF black | 50 | 50 | 50 | 60 | 60 | 60 |
| MT black | | | | 20 | 20 | 20 |
| Process oil | 20 | 20 | 20 | 10 | 10 | 10 |
| Phenyl-β-naphthylamine | 1 | 1 | 1 | 0.5 | 0.5 | 0.5 |
| Magnesium oxide | 1 | 1 | 1 | | | |
| Benzothiazyl disulfide | 1 | 1 | 1 | 1 | 1 | 1 |
| Tetramethylthiuram disulfide | 0.2 | 0.2 | 0.2 | | | |
| Zinc flower | 5 | 5 | 5 | 5 | 5 | 5 |
| Sulfur | 2 | 2 | 2 | 1 | 1 | 1 |
| Stearic acid | | | | 1 | 1 | 1 |

In the above Table 16, (i) of composition (I) and (iv) of composition (II) are the examples of this invention, the rest being Controls. Different blending recipes were used for the Compositions I and II.

Separately, the following compositions, (vii) and (viii) were prepared as the material for a tire carcass, according to the recipes below.

TABLE 17

| Composition | (vii) | (viii) |
|---|---|---|
| Component: | | |
| Natural rubber | 75 | 25 |
| SBR-1502 | 25 | 75 |
| GPF black | 50 | 50 |
| Process oil | 10 | 10 |
| N-phenyl-β-naphthylamine | 0.5 | 0.5 |
| Zinc flower | 5 | 5 |
| Stearic acid | 1 | 1 |
| N-cyclohexyl-2-benzothiazylsylfenamide | 1 | 1 |
| Sulfur | 2 | 2 |

The compositions (i) through (vi) were stuck together with composition (vii) or (viii), and vulcanized at 145° C. for 45 minutes. Thereafter, the peeling test of the adhered faces was performed at 30° C., following the specification of ASTM-D-413-39.

TABLE 18

| Carcass composition | Adherability to carcass fibers (lbs./in.) | | | | | |
|---|---|---|---|---|---|---|
| | (i) | (ii) | (iii) | (iv) | (v) | (vii) |
| (vii) | 90 | 50 | 25 | 150 | 100 | 40 |
| (viii) | 70 | 40 | 25 | 140 | 90 | 40 |

The results in the above Table 18 indicate that the adherability between the carcass portion and inner liner, the most important factor for a practical composition for an inner liner of tubeless tire, is markedly improved by the use of high chlorinated butyl rubber of this invention as one component of the inner liner composition (cf: Table 18, (i) and (iv)).

What is claimed is:

1. A process for the preparation of a chlorinated isobutylene-multiolefin copolymer, which comprises chlorinating at a temperature of 0–100° C. an isobutylene-multiolefin copolymer having a viscosity average molecular weight of 300,000 to 1,000,000 composed of 80–99.5 mol percent of isobutylene units and 20–0.5 mol percent of multiolefin units in the presence of 0.01–10 parts by weight, per 100 parts by weight of said copolymer, of at least one diarylamine derivative of the formula

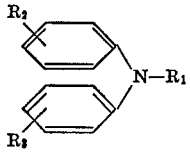

wherein $R_1$ is an aliphatic, alicyclic, or aromatic hydrocarbon radical of 1–20 carbon atoms, $R_2$ and $R_3$ each independently represent hydrogen or an aliphatic or alicyclic hydrocarbon radical of 1–20 carbon atoms, to an extent such that more than one but not exceeding 2 chlorine atoms per double bond in said copolymer are introduced into said copolymer, thereby forming a chlorinated isobutylene-multiolefin copolymer having a viscosity average molecular weight of 300,000 to 800,000.

2. The process of claim 1, wherein said isobutylene-multiolefin copolymer is composed of 90–99.5 mole percent of isobutylene units and 10–0.5 mol percent of isoprene units.

3. The process of claim 1, wherein chlorine is introduced in an amount of 1.5 to 1.9 atoms per double bond of said copolymer.

4. The process of claim 1, wherein the chlorination is performed using gaseous chlorine or sulfuryl chloride.

5. The process of claim 1, wherein the chlorination is performed at 20–80° C. in the presence of an inert solvent of an amount such that the concentration the isobutyl-multiolefin copolymer is 1 to 30 percent by weight.

6. The process of claim 5, wherein said inert solvent is selected from the group consisting of inert hydrocarbons and halogen derivatives of saturated hydrocarbons.

7. The process of claim 1, wherein said diarylamine derivative is expressed by the formula

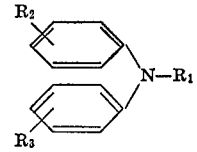

wherein $R_1$ is a saturated or unsaturated hydrocarbon radical having 1 to 16 carbon atoms, a phenyl radical, or phenyl radical substituted with a hydrocarbon radical having 1 to 14 carbon atoms; and $R_2$ and $R_3$ are a hydrogen atom or a lower alkyl group, the substitution positions of $R_2$ and $R_3$ being any of the ortho-, meta-, and para-positions.

References Cited

UNITED STATES PATENTS

| 3,042,662 | 7/1962 | Cottle et al. | 260—853 H |
| 2,995,545 | 8/1961 | Cottle et al. | 260—853 H |
| 3,009,904 | 11/1961 | Serniuk et al. | 260—853 H |

OTHER REFERENCES

Vanderbilt Rubber Handbook, 11th ed. (R. T. Vanderbilt Co., New York,) (1968), pp. 66–70, 73–75, TS 1890 v. 3.

ALLAN LIEBERMAN, Primary Examiner

H. H. FLETCHER, Assistant Examiner

U.S. Cl. X.R.

260—33.8 UA, 41.5 R, 85.3 H, 576

UNITED STATES PATENT OFFICE
CERTIFICATE OF CORRECTION

Patent No. 3,779,979                Dated December 18, 1973

Inventor(s) Shozo Tsuchiya

It is certified that error appears in the above-identified patent and that said Letters Patent are hereby corrected as shown below:

In the heading, insert:

-- Claims priority, application Japan,
   filed December 23, 1970, No. 115699/70 --

Signed and sealed this 16th day of April 1974.

(SEAL)
Attest:

EDWARD M. FLETCHER, JR.           C. MARSHALL DANN
Attesting Officer                 Commissioner of Patents